(12) United States Patent
Shinkai et al.

(10) Patent No.: US 8,059,229 B2
(45) Date of Patent: Nov. 15, 2011

(54) LIGHT CONTROL ELEMENT, SURFACE LIGHT SOURCE DEVICE AND LIQUID CRYSTAL DISPLAY DEVICE

(75) Inventors: Shogo Shinkai, Miyagi (JP); Yasuyuki Kudo, Miyagi (JP); Makoto Aoki, Miyagi (JP); Kiyohiro Kimura, Miyagi (JP); Katsuhiro Doi, Miyagi (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 12/293,521

(22) PCT Filed: Jan. 17, 2008

(86) PCT No.: PCT/JP2008/050551
§ 371 (c)(1),
(2), (4) Date: Jan. 27, 2009

(87) PCT Pub. No.: WO2008/088029
PCT Pub. Date: Jul. 24, 2008

(65) Prior Publication Data
US 2009/0207341 A1  Aug. 20, 2009

(30) Foreign Application Priority Data

Jan. 19, 2007 (JP) ................ P2007-009781

(51) Int. Cl.
*G02F 1/1335* (2006.01)
*F21V 7/04* (2006.01)

(52) U.S. Cl. ........................................ 349/65; 362/620

(58) Field of Classification Search .............. 349/62, 349/65, 95; 362/26, 31, 61, 95, 561, 606, 362/621, 626, 628; 359/599, 707, 831
See application file for complete search history.

(56) References Cited

U.S. PATENT DOCUMENTS

| | | | | |
|---|---|---|---|---|
| 4,505,551 A * | 3/1985 | Jacobs | ............. | 359/232 |
| 6,474,827 B2 * | 11/2002 | Shinohara et al. | ............. | 362/607 |
| 7,201,510 B2 * | 4/2007 | Yamashita et al. | ............. | 362/617 |
| 7,710,512 B2 * | 5/2010 | Lee | ............. | 349/64 |
| 2004/0207775 A1 * | 10/2004 | Min et al. | ............. | 349/65 |
| 2005/0041410 A1 * | 2/2005 | Yamashita et al. | ............. | 362/31 |
| 2005/0248960 A1 | 11/2005 | Yamashita et al. | | |
| 2010/0208170 A1 * | 8/2010 | Tanoue et al. | ............. | 349/65 |

FOREIGN PATENT DOCUMENTS

| | | |
|---|---|---|
| JP | 2004-006245 | 1/2004 |
| WO | 2004/015330 | 2/2004 |

* cited by examiner

*Primary Examiner* — Akm Ullah
(74) *Attorney, Agent, or Firm* — K&L Gates LLP

(57) ABSTRACT

A light control element capable of controlling deflection of light output through a light guide plate to a desired output viewing angle is provided. A light control element (prism sheet) has a plane of incidence on one surface thereof, and a plane of output on the other surface thereof. The plane of incidence is formed as having thereon a number of prism portions arrayed in parallel. Each of the prism portions has a first prism surface allowing incidence of light, and a second prism surface where the light entering through the first prism surface is reflected by total reflection on the inner side. The second prism surface has an outwardly-swelled curved profile, formed with a curvature that allows the light to output through the plane of output at a second output viewing angle wider than a first output viewing angle of a case where the second prism surface is flat.

6 Claims, 10 Drawing Sheets

LIGHT CONTROL ELEMENT, SURFACE LIGHT SOURCE DEVICE AND LIQUID CRYSTAL DISPLAY DEVICE

CROSS REFERENCE TO RELATED APPLICATIONS

The present application claims priority to Japanese Patent Application No. 2007-009781 filed on Jan. 19, 2007, the entire contents of which is being incorporated herein by reference.

BACKGROUND

The present invention relates to a light control element to be used in combination with an edge-light-type backlight unit, a surface light source device, and a liquid crystal display device, for example.

In recent years, liquid crystal display devices have been widely been used as display portion of fixed-type apparatuses having relatively large-sized display screens as typified by monitors of home-use, large-sized television set and desktop personal computer, and for display portion of portable devices as typified by notebook-sized personal computer, mobile phone, digital still camera (DSC) and digital video camera (DVC).

The liquid crystal display device is basically made of a backlight unit (surface light source device) and a liquid crystal display panel. The backlight unit includes those of direct type having a light source disposed right under the liquid crystal display panel, and those of edge light type using a light guide plate, the light guide plate being disposed such that a light source faces one of side edge portions of the light guide plate. The edge light type is widely adopted to portable devices in order to reduce device size.

Methods of display on the display portion of portable devices may be classified into two types. One of which is a method of placing the first priority on the front luminance, while accepting lowering in visibility for wide angle viewing due to insufficient energy of light. Another is a method of pursuing uniform visibility for wide angle viewing, by widening the viewing angle while sacrificing the front luminance to some degree. The former is adopted to devices intended for personal use, as typified by notebook-sized personal computer and mobile phone, whereas the latter is adopted to devices, as typified by DSC and DVC, intended for use in a case where captured images are viewed by many people at different viewing angles.

As a method of directing light from the backlight towards the liquid crystal display panel in the edge light system, there has been known a method of using a light control element having a structured surface such as triangular prisms, and disposing the light control element adjacent to the light guide plate, while directing the structured surface opposed to the plane of output side of the light guide plate (see Japanese Patent Application Publication No. Hei 6-18879, for example).

On the other hand, Japanese Patent Application Publication No. Hei 7-325208 listed below discloses a lens sheet disposed adjacent to the light guide plate on the plane of output side thereof. The lens sheet has prism-like structures that face the light guide plate. In the shape of each prism, the oblique surface thereof is bent in the cross-sectional profile, so as to make prism angle of the base larger than the apex angle.

As described above, for the case where the structured surface is formed with a triangular prism form, light output from the light guide plate can be deflected towards a desired direction by examining angle of oblique surface of prism and so forth. However, the triangular prism is only to direct the light, output from the light guide plate within a small range of directivity, towards the liquid crystal display panel while keeping the angle unchanged, so that the range of output angle of light output from the prism sheet, that is, output viewing angle cannot be controlled by the prism portion. This is only permissible for portable devices for personal use in the above description, but not suitable for wide angle viewing by many people.

On the other hand, the lens sheet described in Patent Document 2 expands the range of output angle of light, by bending the oblique surface of prism in the cross-sectional profile, so as to make the prism angle at the base larger than the apex angle. However, direction of reflection of light discontinuously changes as being bounded by the bent portion of the prism surface, so that intensity distribution of the output light tends to cause non-uniformity, inevitably degrading quality of image on the liquid crystal display portion.

SUMMARY

Considering the above-described problems, embodiments of the present application provide a light control element, a surface light source device and a liquid crystal display device, capable of controlling deflection of light output from a light guide plate to a desired output viewing angle.

In an embodiment, a light control element includes a plane of incidence on one surface thereof, and a plane of output on the other surface thereof. In the plane of incidence, a number of prism structure portions are arrayed in parallel. Each of the prism structure portions has a first prism surface allowing incidence of light, and a second prism surface where the light entering through the first prism surface is reflected by total reflection on the inner side. The second prism surface has an outwardly-swelled curved profile, with a curvature that allows an output viewing angle to be wider than an output viewing angle of a case where the second prism surface is flat.

In other words, a light control element of the embodiment has a plane of output allowing light to output therethrough, and a plane of incidence having thereon a number of prism portions arrayed in parallel. The prism portion has a first prism surface allowing incidence of light, and a second prism surface where the light entering through the first prism surface is reflected by total reflection on the inner side to output the light from the plane of output. The second prism surface has an outwardly-swelled curved profile, formed with a curvature that allows the light to output through the plane of output at a second output viewing angle wider than a first output viewing angle of a case where the second prism surface is flat.

Light entering the first prism surface of the prism portion is reflected by total reflection at the inner side of the second prism surface of the prism portion, and is output through the plane of output of the light control element. If the second prism surface is flat, a range of output angle of light output from the plane of output may correspond to a range of incidence angle of light entering the first prism surface. As the second prism surface is being outwardly swelled to have a curved profile, the range of output angle of light output from the plane of output is narrowed and condensation performance is enhanced up to a certain curvature. As the curvature of the curved profile exceeds that a certain curvature, the range of output angle is widened, thereby the output viewing angle is widened as compared with the case where the second prism surface is flat.

Accordingly, the light control element of the present embodiment adopts an outwardly swelled predetermined curved profile to the second prism surface of the prism portion provided to the plane of incidence, so as to widen the output viewing angle (second output viewing angle) of light reflected by total reflection at the inner side of the second prism surface, as compared with the output viewing angle (first output viewing angle) of a case where the second prism surface is assumed flat. In this way, image quality suitable for wide angle viewing by many people can be provided. Furthermore, the second prism surface is given with a continuous curved profile. Accordingly, the output light does not cause non-uniformity in intensity distribution thereof.

In the light control element of the embodiment, a desired output viewing angle can be obtained by arbitrarily adjusting the curvature of the curved surface composing the second prism surface of the prism portion. The curved profile may be formed, of course, by a single curvature, or may be formed continuously by a plurality of curvature.

In the light control element of the present embodiment, if the second prism surface has an arc profile with a constant curvature, a specific profile of the second prism surface, capable of ensuring the output viewing angle wider than the first output viewing angle of a case where the second prism surface is flat, may be such a profile that satisfies a condition $1.1 < R/H \leqq 5.0$, where height of the prism portion is H [μm], and radius of curvature of the second prism surface is R [μm].

If R/H is 1.1 or lower, the base angle on the second prism surface side of the prism portion (angle between a plane of formation of the prism portion (plane of incidence) and the inner surface of the second prism surface) will be close to 90° or exceed 90°, so that a region capable of deflecting the light frontward will be reduced, and improvement in luminance cannot be achieved. Furthermore, manufacturing of this sort of prism portion may be difficult. On the other hand, if R/H exceeds 5.0, condensation performance will be enhanced in turn, so that the output viewing angle (second output viewing angle) wider than the output viewing angle (first output viewing angle) of a case where the second prism surface is flat, can not be obtained.

The profile of the first prism surface of the prism portion is not specifically limited, and both flat plane and curved profile may be used. The first prism surface may appropriately be set in conjunction with the profile design of the second prism surface, thereby degree of freedom in designing the prism portion in response to required output viewing angle may be improved.

On the other hand, a surface light source device of the present embodiment is characterized in having a light guide plate made of a translucent material, a light source disposed at one side-end portion of the light guide plate, and a light control element disposed on the plane of output side of the light guide plate, the light control element having a plane of incidence on one surface thereof, and a plane of output on the other surface thereof. The light control element has a number of prism structure portions arrayed in parallel on the plane of incidence. Each of the prism structure portions has a first prism surface allowing incidence of light, and a second prism surface where the light entering through the first prism surface is reflected by total reflection on the inner side. The second prism surface has an outwardly-swelled curved profile, with a curvature that allows an output viewing angle to be wider than an output viewing angle of a case where the second prism surface is flat.

In other words, the surface light source device of the present embodiment has a light control element including a plane of output allowing light to output therethrough, and a plane of incidence having thereon a number of prism portions arrayed in parallel; a light guide plate disposed on a side of the plane of incidence of the light control element and made of a translucent material having a side end portion; and a light source disposed at the side end portion of the light guide plate. The prism portion has a first prism surface allowing incidence of light, and a second prism surface where the light entering through the first prism surface is reflected by total reflection on the inner side to output the light from the plane of output. The second prism surface has an outwardly-swelled curved profile, formed with a curvature that allows the light to output through the plane of output at a second output viewing angle wider than a first output viewing angle of a case where the second prism surface is flat.

A liquid crystal display device of the present embodiment is characterized in having a liquid crystal display panel, and a backlight unit illuminating the liquid crystal display panel from the back face side. The backlight unit includes a light guide plate made of a translucent material, a light source disposed at one side end portion of the light guide plate at one side end portion, and a light control element disposed on the plane of output side of the light guide plate, the light control element having a plane of incidence on one surface thereof and a plane of output on the other surface thereof. The light control element has a number of prism structure portions arrayed in parallel on the plane of incidence thereof. Each of the prism structure portions has a first prism surface allowing incidence of light, and a second prism surface where the light entering through the first prism surface is reflected by total reflection on the inner side. The second prism surface has an outwardly-swelled curved profile, with a curvature that allows an output viewing angle to be wider than an output viewing angle of a case where the second prism surface is flat.

In other words, the liquid crystal display device of the present embodiment has a light control element which includes a plane of output allowing light to output therethrough, and a plane of incidence having thereon a number of prism portions arrayed in parallel; a light guide plate disposed on a side of the plane of incidence of the light control element and made of a translucent material having a side end portion; a light source disposed at the side end portion of the light guide plate; and a liquid crystal display panel disposed on the plane of output side of the light control element. The prism portion has a first prism surface allowing incidence of light, and a second prism surface where the light entering through the first prism surface is reflected by total reflection on the inner side to output the light from the plane of output. The second prism surface has an outwardly-swelled curved profile, formed with a curvature that allows the light to output through the plane of output at a second output viewing angle wider than a first output viewing angle of a case where the second prism surface is flat.

According to the configuration described above, a strongly-directed light output from the plane of output of the light guide plate can be deflected by the light control element over a wide output viewing angle, thereby a surface light source device and a liquid crystal display device suitable for viewing by many people can be provided.

As described in the above, the light control element of the present invention may expand the strongly-directed light output from the light guide plate to a desired output viewing angle. Furthermore, a surface light source device and a liquid crystal display device suitable for viewing by many people may be obtained.

Additional features and advantages are described herein, and will be apparent from, the following Detailed Description and the figures.

DETAILED DESCRIPTION

Embodiments will be explained below, referring to the attached drawings.

Figure 1:
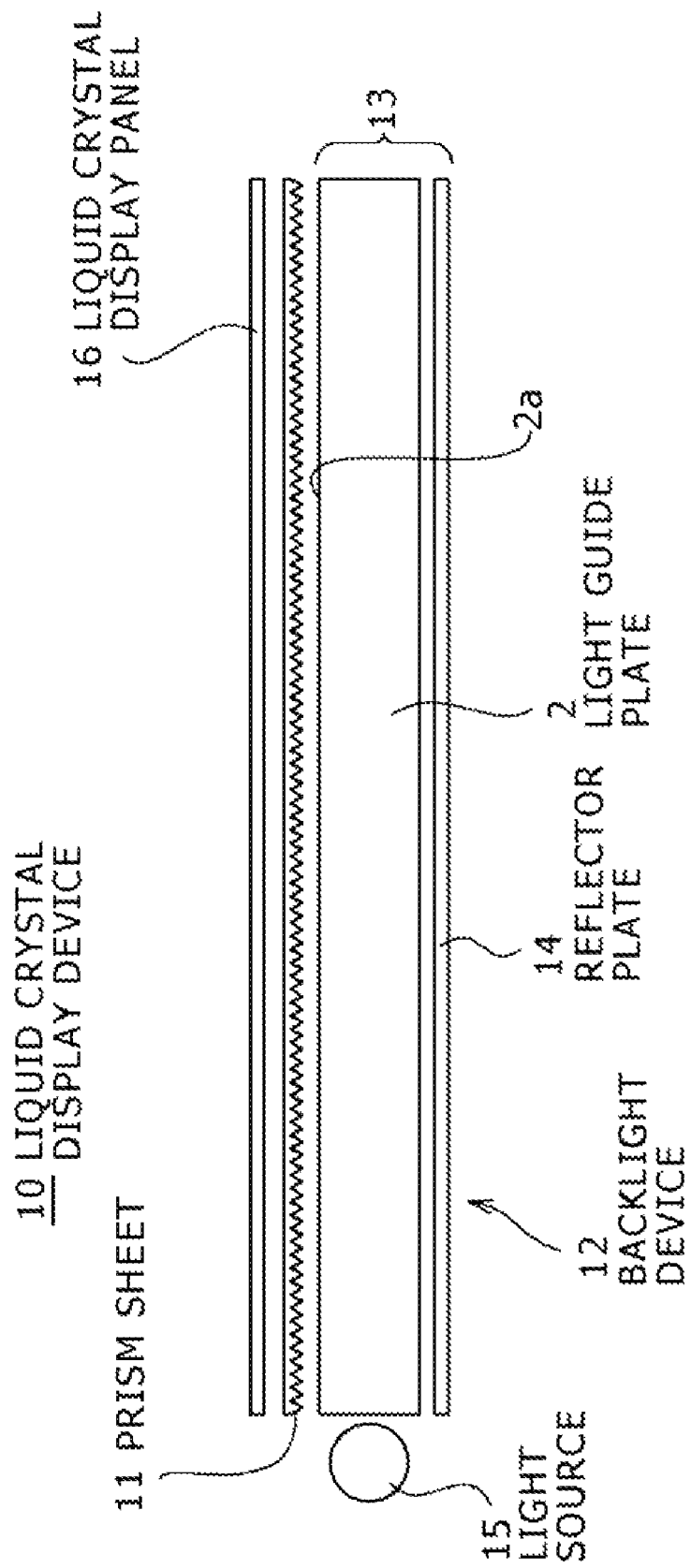
FIG. 1 An exploded side view showing a schematic configuration of a liquid crystal display device according to an embodiment.

FIG. 1 is an exploded side view showing a schematic configuration of a liquid crystal display device 10 according to an embodiment. A liquid crystal display device 10 is constructed with a backlight device 12 as a surface light source device, and a liquid crystal display panel 16. The backlight device 12 has a backlight unit 13, and a prism sheet 11 as a light control element according to the present invention. Other optical elements, such as a diffuser sheet, a polarization splitter sheet or the like, may additionally be disposed between the prism sheet 11 and the liquid crystal display panel 16.

The backlight unit 13 is configured as the edge light type, having a light guide plate 2 made of a translucent material, and a light source 15 disposed at one side end portion of the light guide plate 2, and a reflector plate 14 disposed on the back face side (bottom face side in the drawing) of the light guide plate 2. In the present embodiment, a linear light source such as CCFL, or a single or a plurality of point light source such as LED, are used as the light source 15.

The light guide plate 2 is made of an injection-molded product of a colorless, transparent resin allowing transmission of light in the wavelength region of the light used for the light source, such as acrylic resins, methacrylic resins, styrene resins, polycarbonate resins and so forth. The top surface of the light guide plate 2 is given as a plane of output 2a allowing light from the light source 15 to output therethrough, and constructed such that the light is output with a predetermined range of output angle (central angle α) towards the prism sheet 11 side.

The reflector plate 14 has a metal foil of silver, aluminum or the like, or a white coated film, provided on the inner surface side thereof opposed to the light guide plate 2, and functions to reflect the light leaked from the light guide plate 2 or reflected on the prism sheet 11 towards the front direction (upward in the drawing).

The prism sheet 11 has a function of adjusting angular intensity distribution of the light output from the backlight unit 13, and of allowing the light to be output towards a side of the liquid crystal display panel 16 at a certain output viewing angle. The light output from the prism sheet 11 is entering the liquid crystal display panel 16. The liquid crystal display panel 16 displays an image on the screen while performing control of modulating the light pixel by pixel.

Next, the prism sheet 11 of the present embodiment will be detailed.

The prism sheet 11 has a surface, given as the plane of incidence, on one side opposed to the light guide plate 2, and the other surface, given as the plane of output allowing the light to output therethrough, on the other side opposed to the liquid crystal display panel 16. On the plane of incidence of the prism sheet 11, a number of prism portions 11P are arrayed in parallel, in the direction from one side end portion of the light guide plate 2, where the light source 15 is disposed, towards the other side end portion opposed thereto.

Figure 2:
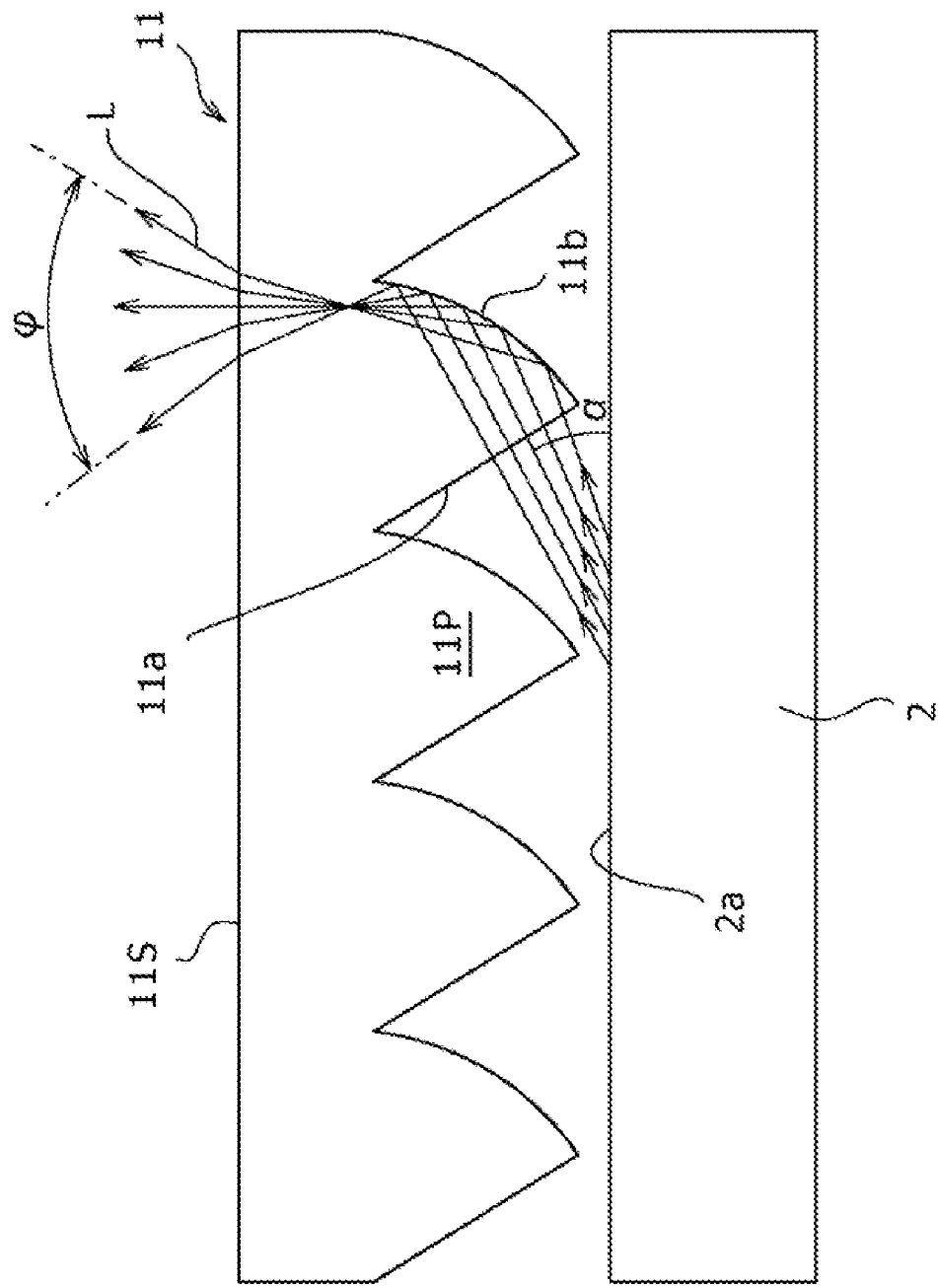
FIG. 2 A cross-sectional view showing a main portion of a prism sheet as a light control element according to an embodiment.

FIG. 2 is an enlarged cross-sectional view of the prism sheet 11. The prism portion 11P of the present embodiment has a structure such that a triangular-sectioned prism component has a curved profile on one prism surface thereof. One prism surface 11a of the prism portion 11P is given as a flat-profiled first prism surface which serves as a plane of incidence of light output from the plane of output 2a of the light guide plate 2, and the other prism surface 11b of the prism portion 11P is given as a curved second prism surface which allows light entering through the first prism surface 11a to totally reflect on the inner surface side thereof.

The second prism surface 11b has an outwardly swelled curved profile. By virtue of the second prism surface 11b formed according to a predetermined curved profile, the profile being outwardly swelled, and the light entering through the first prism surface 11a is reflected by total reflection and deflected towards the front direction (direction towards the liquid crystal display panel 16). At the same time, the deflected light is output out from a plane of output 11S at a predetermined output viewing angle φ.

Figure 3:
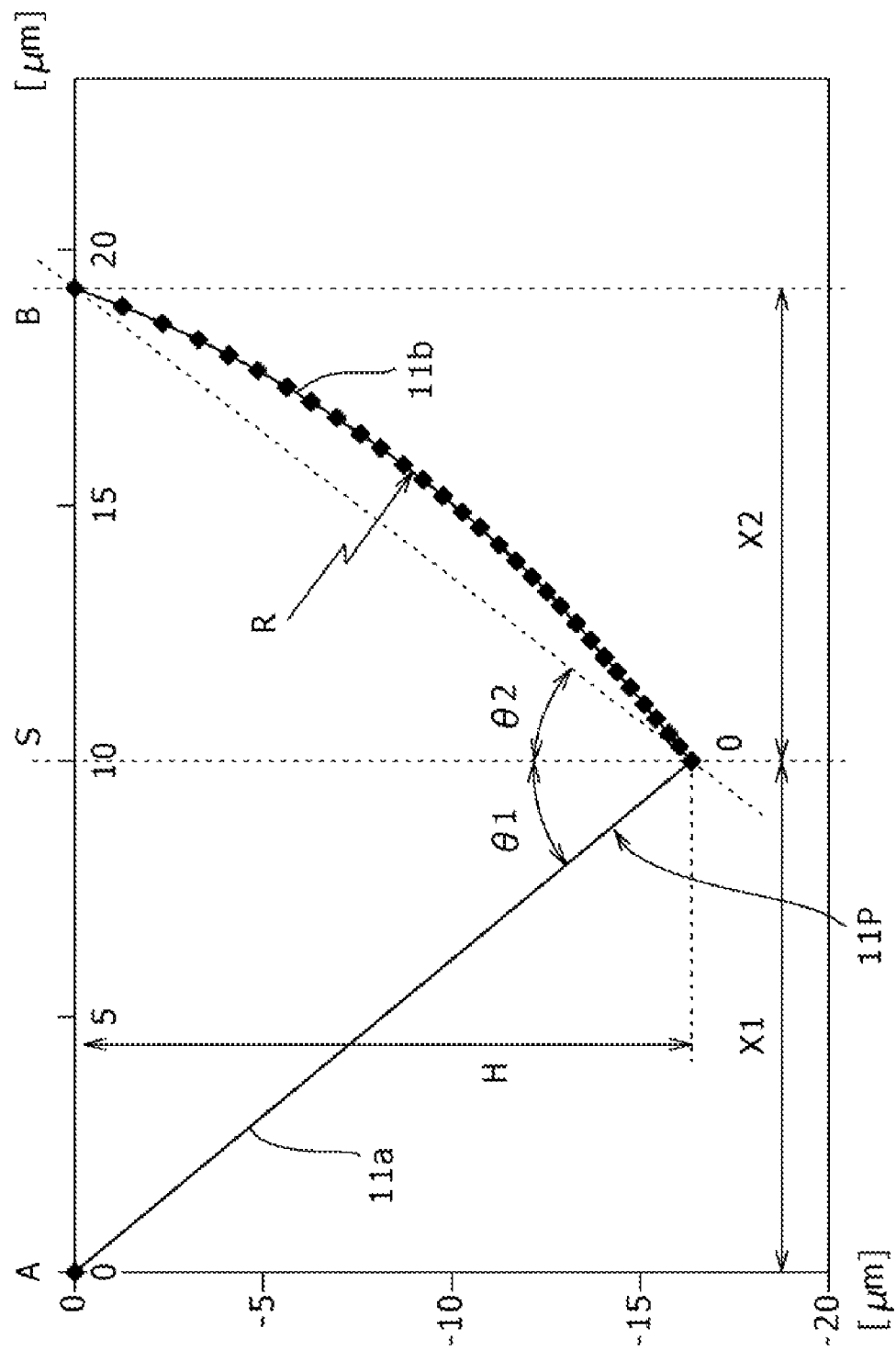
FIG. 3 An enlarged view of the prism portions forming the prism sheet shown in FIG. 2.

FIG. 3 is an enlarged view of the profile of the prism portion 11P. The prism portion 11P is constructed using as a reference a virtual prism component having a cross-section of triangle OAB having one apex O and two bases A, B. The first prism surface 11a corresponds to one oblique side OA of triangle OAB, and the second prism surface 11b is formed by a curved profile swelled out from the other oblique side OB of triangle OAB at a curvature of a predetermined level or larger.

More specifically, triangle OAB is a triangle where an angle between oblique side OA and perpendicular OS through point O fallen on AB is θ1; an angle between oblique side OB and the segment OS is θ2; distance X1 between A and S is approximately 10 μm; and distance X2 between B and S is approximately 9 μm. The prism portion 11P has the first prism surface 11a with a linear form corresponded to segment OA, and the second prism surface 11b with an arc form passing through point O and point B. In the exemplary prism portion 11P shown in the drawing, height H (corresponded to length of segment OS) is approximately 16 μm, and pitch of array (distance between the apexes of the adjacent prism portions, corresponds to the sum of X1 and X2) is approximately 19 μm. Of course, sizes of X1, X2 and H are not limited to those exemplified in the above. The pitch of array, for example, may be adjustable by similarity transformation (similarity shrinkage, similarity expansion).

Figure 10:
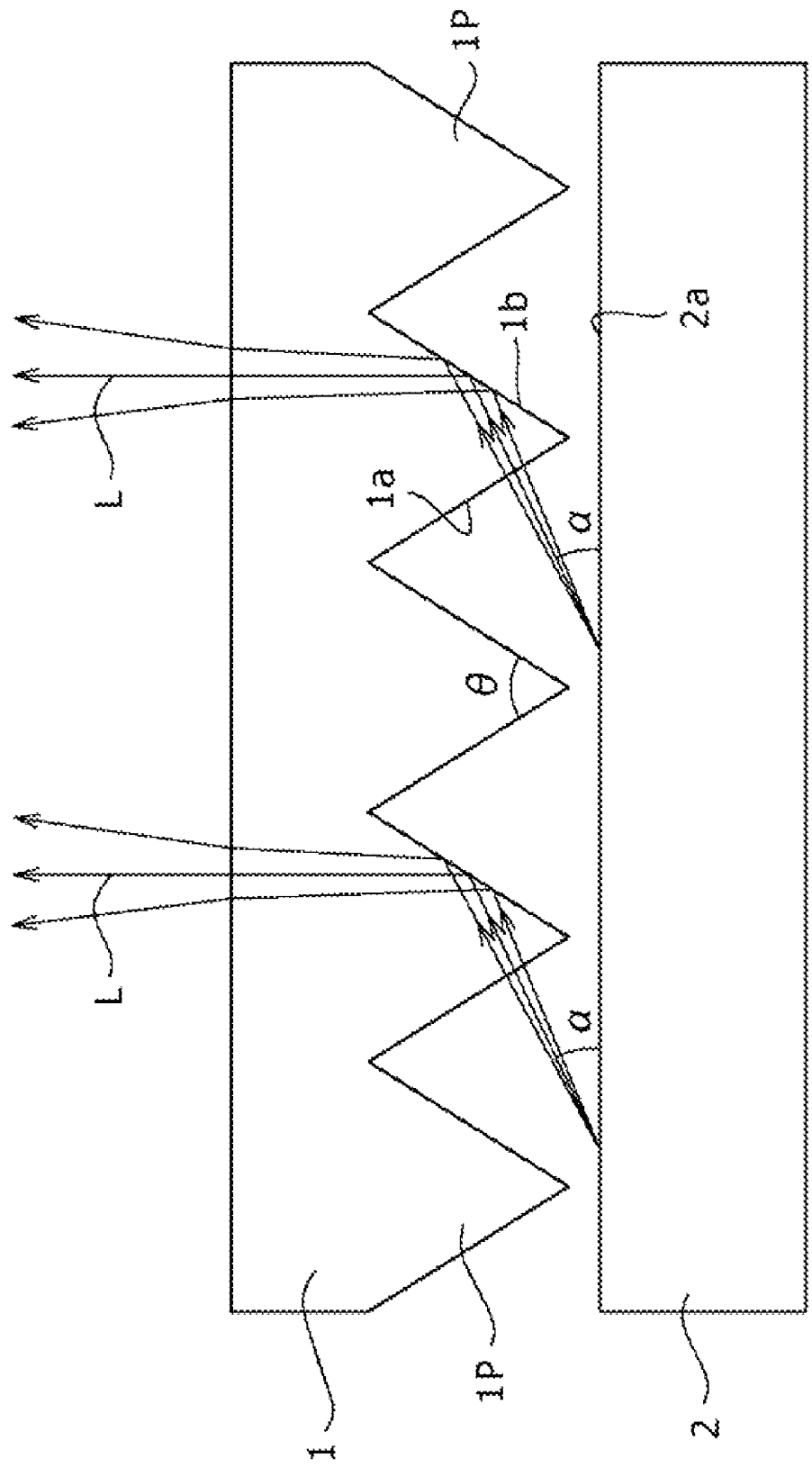
FIG. 10 A schematic side view showing an exemplary configuration of a conventional prism sheet.

FIG. 10 shows a prism sheet 1 having on the lower surface thereof triangular-sectioned prisms 1P arrayed at a constant pitch. "2" is a light guide plate, on the left side of which in the drawing, a light source (not shown) is disposed. For the case where thus-structured prism sheet 1 is disposed over the light guide plate 2, the light guide plate 2 is designed so as to make angle of light extracted from the plane of output 2a shallow (so as to reduce angle α). Each prism 1P of the prism sheet 1 has a certain apex angle θ. The prism 1P allows light L output from the plane of output 2a of the light guide plate 2 at a shallow angle to enter through one prism surface 1a thereof, and to totally reflect on the inner surface side of the other prism surface 1b, to thereby raise the light vertically upward (to the front direction of the liquid crystal display panel).

Various values of the apex angle θ of prism have been known under the specification, and 63° is a representative angle. Assuming now refractive index of the prism sheet as approximately 1.59, the output angle (central angle) α from the light guide plate 2 allowing the light L to be raised up vertically upward will be approximately 31°.

In the prism sheet 11 of the present embodiment, the curved surface forming the second prism surface 11b is formed with a curvature, which ensures an output viewing angle (second output viewing angle) wider than an output viewing angle (first output viewing angle) of a case where the second prism surface is flat. Details will be explained below.

Figure 4:
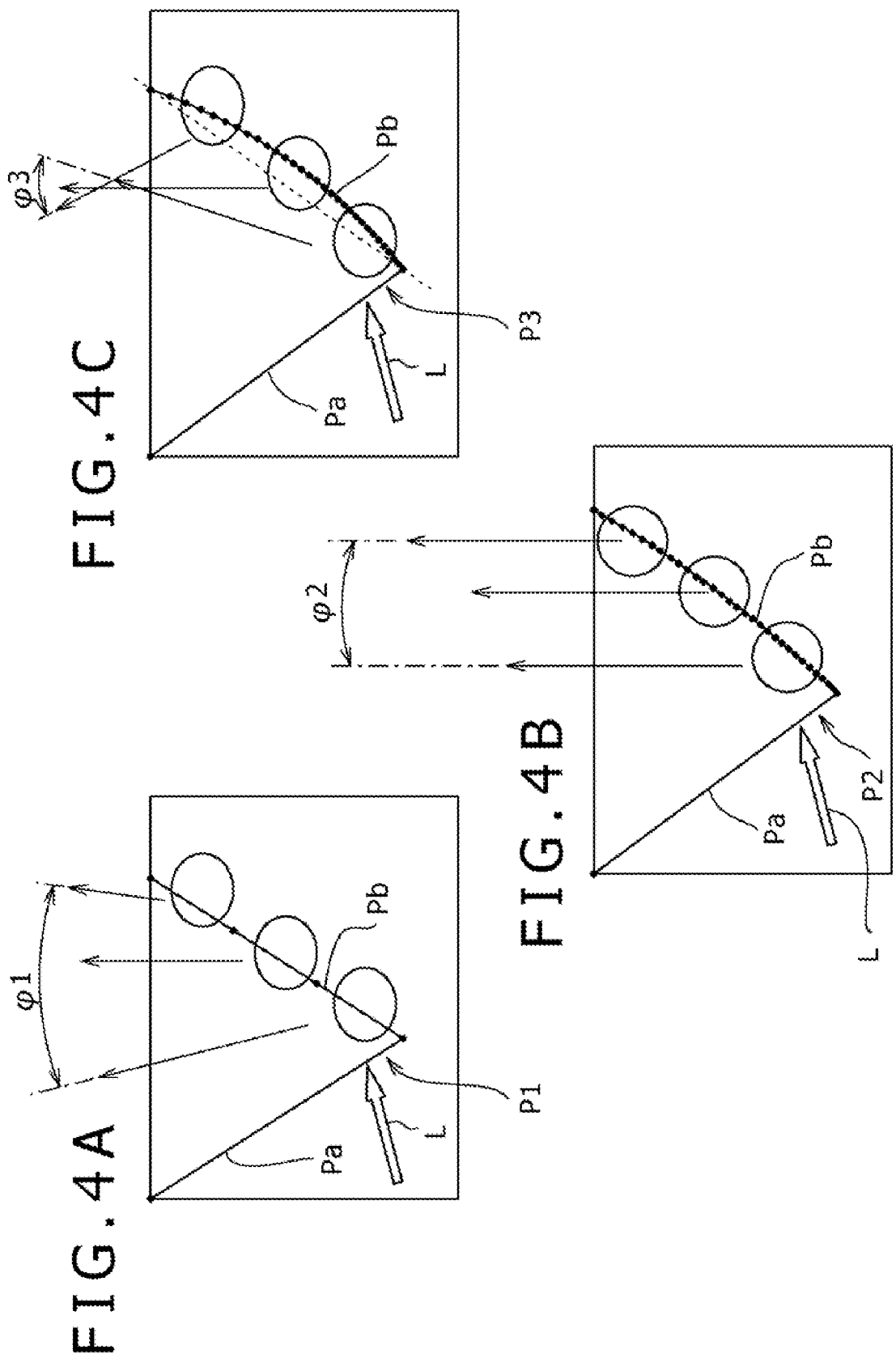
FIG. 4 Drawings showing changes in the range of output angle of light reflected by total reflection on a second prism surface, under varied profile of the second prism surface of the prism portions.

FIG. 4 shows changes in the output angle of light reflected by total reflection on the inner surface of the second prism surface, observed when the profile of the second prism surface was varied. FIG. 4A shows a prism portion P1 (corresponded to the prism 1P shown in FIG. 10) having a flat second prism surface Pb, and FIGS. 4B and 4C show prism portions P2, P3 having curved second prism surfaces Pb.

The light L entering through a first prism surface Pa is reflected by total reflection on the inner side of the second prism surface Pb, and output out from the plane of output of the prism sheet. If the second prism surface Pb is made flat, as shown in FIG. 4A, a range of output angle (output viewing angle) φ1 of light reflected by total reflection on the second prism surface Pb corresponds to a range of incidence angle of light with respect to the first prism surface Pa. Alternatively, if the second prism surface Pb is given as arc, as shown in FIG. 4B, the range of output angle φ2 of light reflected by total reflection on the second prism surface Pb will be narrowed up to a predetermined range of curvature of an arc surface, and thereby condensation performance is enhanced as compared with the case shown in FIG. 4A. On the other hand, if the curvature of the second prism surface Pb is increased to a predetermined level or larger, as shown in FIG. 4C, the range of output angle φ3 of light reflected by total reflection on the second prism surface Pb will be widened as compared with the case shown in FIG. 4A. In the present embodiment, as shown in FIG. 4C, the second prism surface Pb is formed with a radius of curvature ensuring an output viewing angle (second output viewing angle) wider than an output viewing angle (first output viewing angle) of a case where the second prism surface Pb is flat.

Figure 5:
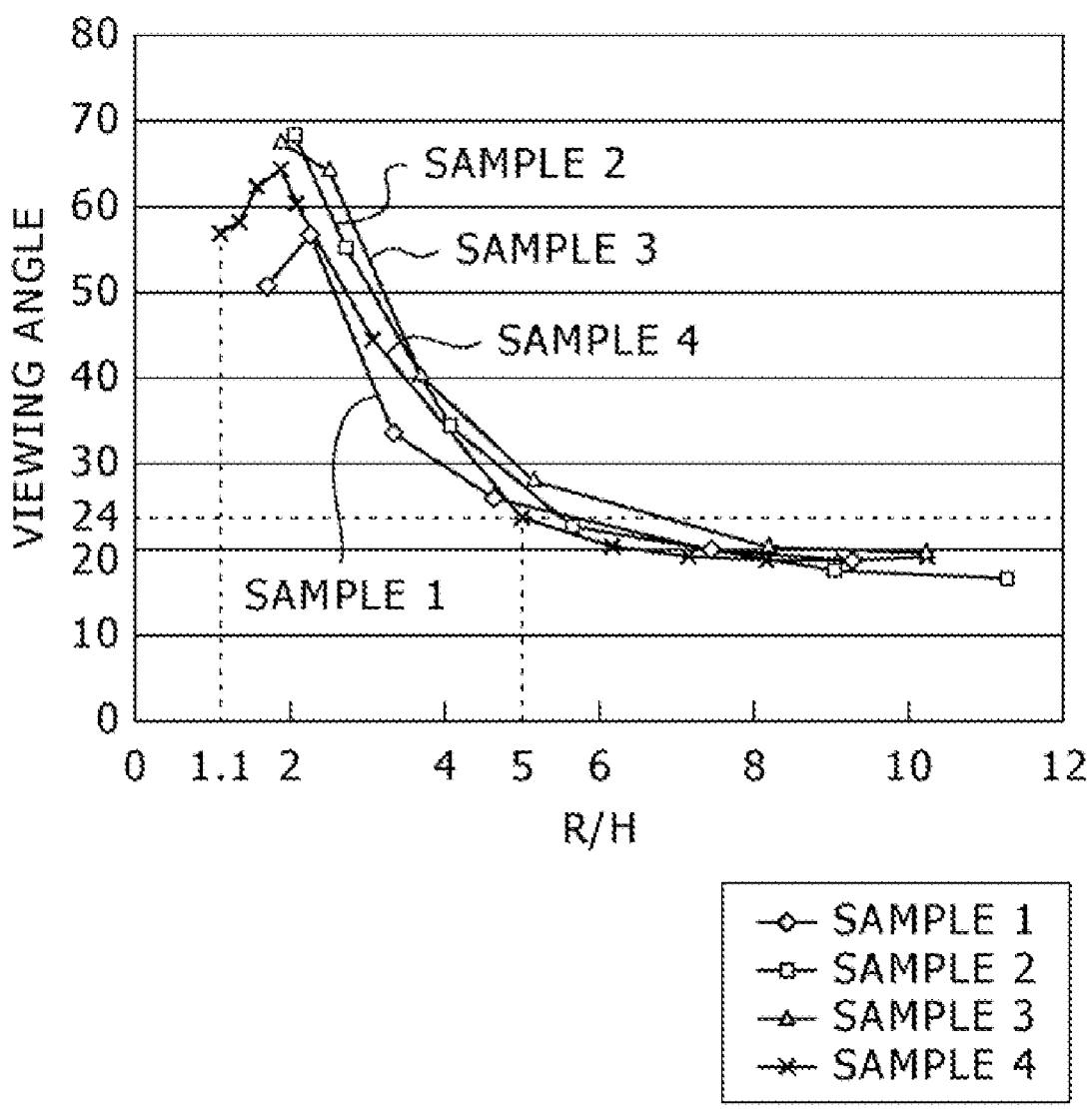
FIG. 5 Results of simulation of output viewing angle compared among a plurality of prism portions differed in profile of the second prism surface.

FIG. 5 comparatively shows results of simulation comparing output viewing angle obtained from a plurality of prism portions differed in profile of the first prism surface. The axis of abscissa of FIG. 5 represents ratio (R/H) of radius of curvature R [μm] and height of prism portion H [μm] of a second prism surface formed with a curved profile, and the axis of ordinate represents the viewing angle. The viewing angle herein means a range of angle with a relative intensity of 0.5 or larger while assuming an intensity peak value of 1. The viewing angle corresponds to the output viewing angle φ shown in FIG. 2.

Samples 1, 2 and 4 differ from each other in angle of inclination θ1 of segment OA, which is assumed as the reference oblique side of the first prism surface 11a shown in FIG. 3, away from apex O, where θ1=29° for sample 1, θ1=34° for sample 2, and θ1=31.5° for sample 4. Sample 3 is modified from sample 4 so as to form the first prism surface with an outwardly-swelled curved profile. Each of samples 1 to 4 contains a group of samples varied in the radius of curvature R of the second prism surface in 7 ways, with respect to prism height H obtained while fixing the pitch of array of prisms (X1+X2) under the condition of θ1, as shown by the individual plots on the kinked lines shown in FIG. 5. Ranges of the output angle of light, entering the individual samples and output from the light guide plate, fall in the range approximately 14° to approximately 40° (peak angle of 31°), assuming refractive index of the individual samples is 1.59. If θ1 is adjusted to 31°, sample 1 corresponds to a low-angle light source, and sample 2 corresponds to a high-angle light source.

As shown in FIG. 5, generally, there is seen a decreasing tendency of viewing angle as the value of R/H increases. This is because increase in the radius of curvature of the curved surface forming the second prism surface makes the light, reflected by total reflection on the inner surface of the second prism surface, bend frontward so as to enhance the condensation performance. In this example, the viewing angle is 24° assuming that the second prism surface is a flat surface (corresponded to straight line OB in FIG. 3). Accordingly, the range of R/H, capable of ensuring that the output viewing angle (second output viewing angle) is wider than the output viewing angle (first output viewing angle) of a case where the second prism surface is flat, will be given as $1.1 < R/H \leq 5.0$.

Similar results were obtained also when the radius of curvature R of the second prism surface was varied in 7 ways, with respect to the prism pitch (X1+X2) obtained while fixing the prism height H in each sample group under the above-described condition θ1.

The reason why R/H>1.1 was given is that, if R/H has a value of 1.1 or smaller, the base angle of the prism portion on the second prism surface side (∠OBA in FIG. 3) will be as close as 90° or will be 90° or larger, reducing a region capable of deflecting the light frontward, and preventing improvement of the luminance. Another reason is that manufacture of the prism portion having such a profile may be difficult.

Figure 6:
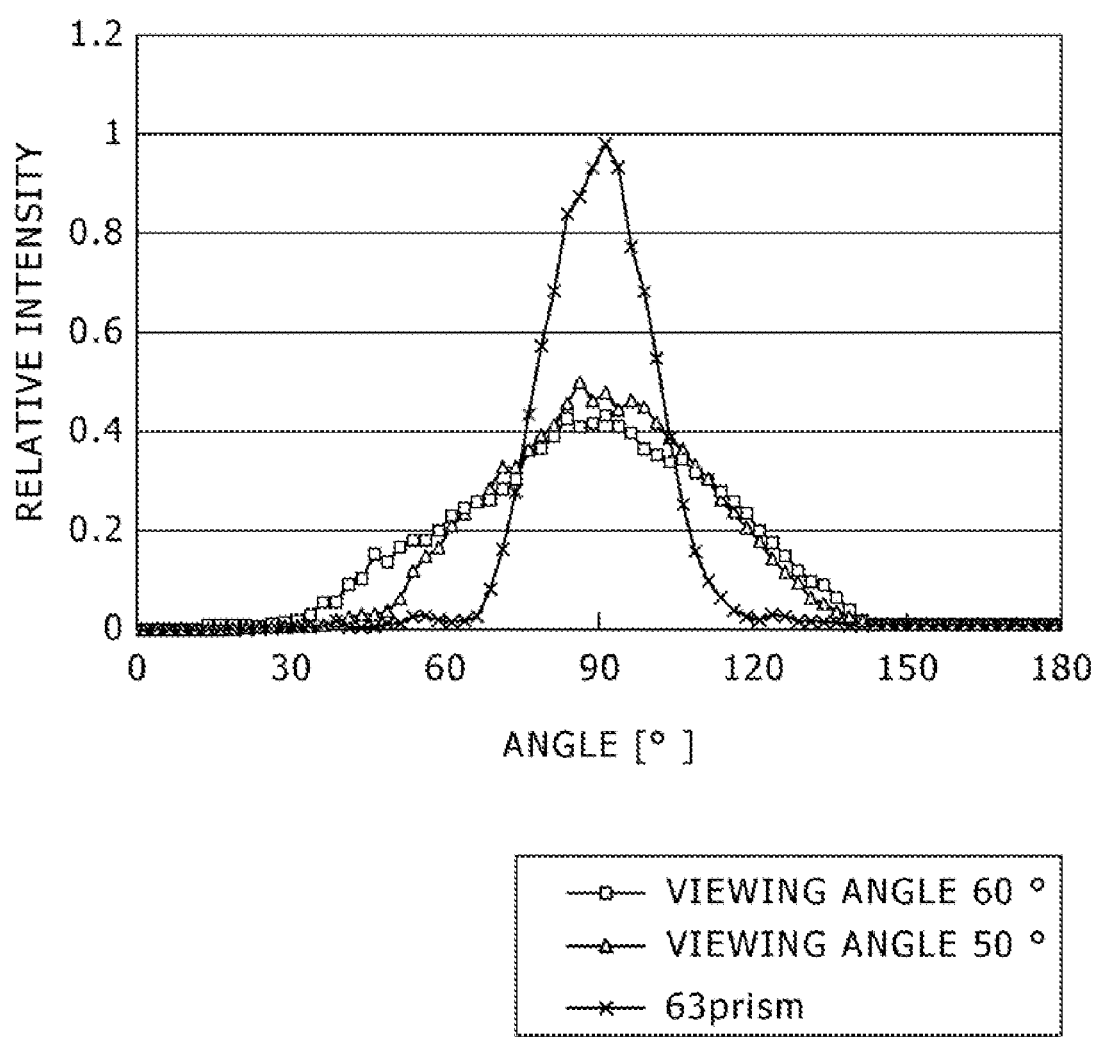
FIG. 6 Results of simulation showing an example of intensity distribution of the prism portion.
Figure 7:
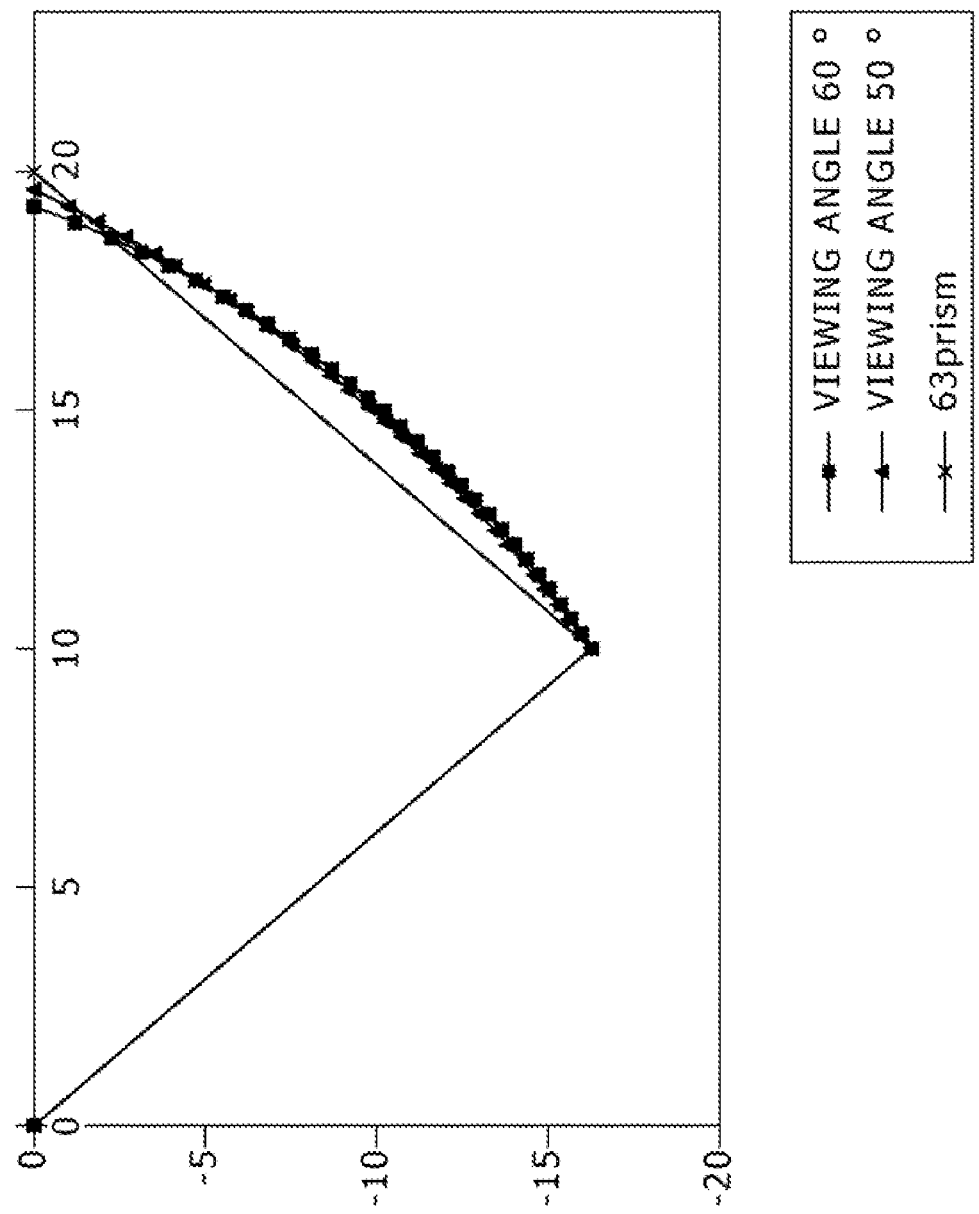
FIG. 7 A drawing showing exemplary profiles of the second prism surface of the samples used for simulation shown in FIG. 6.

FIG. 6 shows results of simulation of luminance distribution of the prism portion ensuring viewing angles of 60° and 50°. The axis of abscissa represents direction of output of light, wherein 90° corresponds to the front direction. The axis of ordinate represents relative intensity assuming intensity observed in the front direction for the case where isosceles triangular prism components (63 prisms) having an apex angle of 63° were used as 1. FIG. 7 shows profiles of the second prism surface of the prism portions ensuring viewing angles of 60° and 50°.

Referring now to FIG. 3, the prism portion for a viewing angle of 60° is such that R=34.1 μm, θ1=31.5°, θ2=30.31°, and pitch is 19.54 μm (X1=10 μm, X2=9.54 μm), and the prism portion for a viewing angle of 50° is such that R=42.28 μm, θ1=31.5°, θ2=29.57°, and pitch is 19.26 μm (X1=10 μm, X2=9.26 μm). The pitch of array of the prism portions may be altered by modifying setting of θ2.

Figure 8:
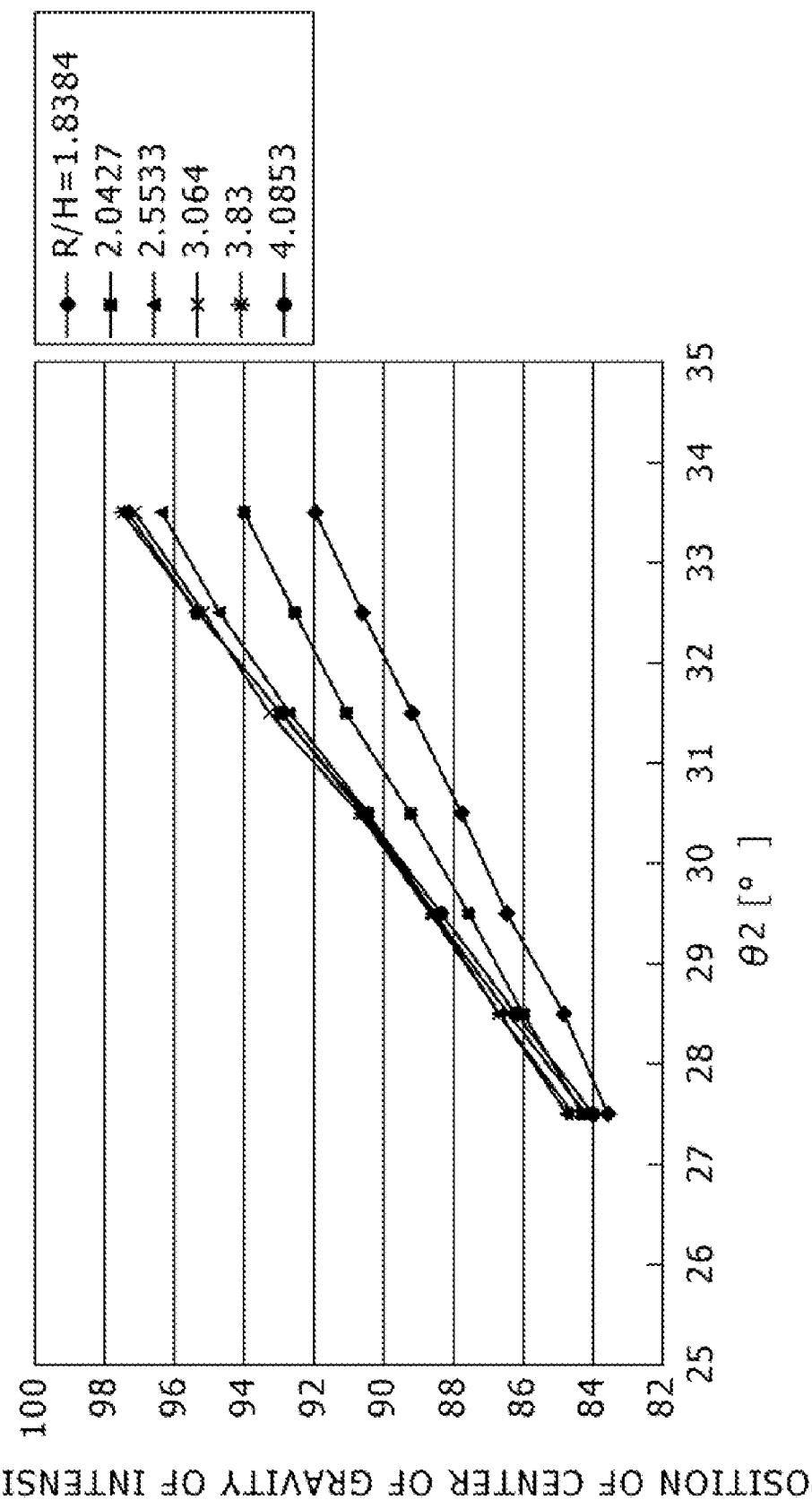
FIG. 8 A drawing showing relations between angle of inclination θ2 of the reference oblique side of the second prism surface of the prism portion and the position of center of gravity of intensity distribution.

In addition, position of the center of gravity in the intensity distribution (intensity peak) may be adjustable by varying a value of angle θ2. FIG. 8 shows relations between angle θ2 and position (angle) of center of gravity of intensity in the various samples differed in R/H value of the prism portion. As is clear from FIG. 8, position of center of gravity of intensity distribution shifts towards the higher angle side as the angle θ2 increases. Because the center of gravity of intensity distribution may arbitrarily be varied by adjusting the angle θ2, luminance characteristics adapted to specification and so forth of the devices may be more readily designed.

Thus-structured prism sheet 11 of the present embodiment is made of transparent film or sheet made of, for example, polycarbonate, polyvinyl, acrylic resin, polyamide, polyethylene terephthalate, poly-α-olefin, cellulose resin, glass, etc, all having optical transparency. Each prism portion 11P may be formed on the surface of these transparent films as being integrated therewith, or a layer having the prism portions 11P formed thereon may be placed on these transparent films and may be integrated in the later process. Methods of forming the prism sheet 11 are not specifically limited, and other methods such as mold forming using heat pressing, mold forming using ultraviolet curable resin, and continuous molding such as fusion extrusion, etc, may be utilized.

Because the second prism surface 11b of each of the plurality of prism portions 11P arrayed on the plane of incidence is formed conforming to a predetermined curved profile in the prism sheet 11 constructed as described in the above, the output viewing angle (second output viewing angle) of light output from the plane of output 11S after being reflected by total reflection on the second prism surface 11b may be made wider than the output viewing angle (first output viewing angle) of a case where the second prism surface is flat.

In addition, a light control element having both of a desired viewing angle and luminance distribution characteristics may readily be designed and manufactured, by arbitrarily adjusting the profile (angle θ2, radius of curvature R, height H) of the second prism surface 11b. Furthermore, because the second prism surface is formed based on a continuous curved profile, the visibility over a wide viewing angle may be improved without causing non-uniformity in intensity distribution of output light.

On the other hand, the backlight device 12 of the present embodiment has thus-structured prism sheet 11 set over the light guide plate 2. Accordingly, the viewing angle characteristics may be improved as compared with the conventional backlight device having a triangular-sectioned prism sheet, and furthermore a surface light source device having both of desired viewing angle and luminance distribution characteristics may be constructed.

Furthermore, the liquid crystal display device 10 of the present embodiment may provide such an image quality suitable for viewing by many people from wide angles by virtue of thus-structured backlight device 12.

The embodiments have been explained in the above. However, various modifications based on the technical conception of the present invention may be possible.

For example, in the embodiment described in the above, the range of output angle of light output from the prism sheet 11 was adjusted by setting ratio (R/H) of the radius of curvature of the second prism surface 11b and height of the prism portion 11P. Alternatively, angle of inclination θ1 of the first prism surface 11a, which serves as the plane of incidence of light, may be added to the design parameters. By adjusting the angle of inclination θ1 of the first prism surface 11a, the angle of incidence of light to the inner surface of the second prism surface 11b changes, and thereby the output viewing angle of light can be controlled.

Furthermore, the first prism surface 11a of the prism portion 11P, having been described in the above embodiment as being a linear and flat surface, is not limited thereto, and may have a curved profile. In this case, by making the first prism surface have an outwardly swelled curved profile, the first prism surface can now function as a lens surface, thereby an aperture effect of incident light may be obtained, and directivity of light incident on the second prism surface 11b may be improved.

Figure 9:
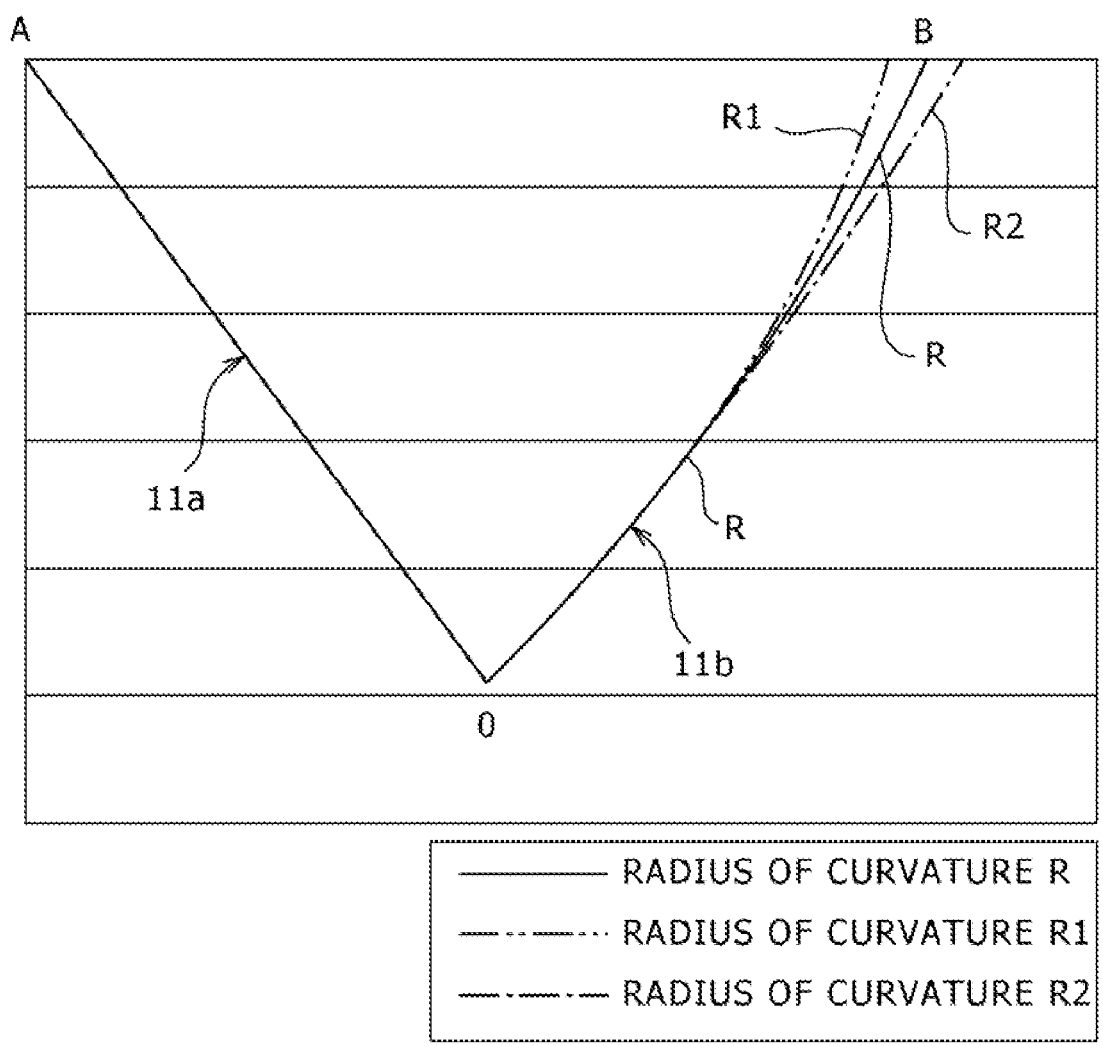
FIG. 9 An enlarged view of a prism portion showing an exemplary modified embodiment.

Still furthermore, the second prism surface 11b of the prism portion 11P in the above embodiment was formed with a single curved profile of a radius of curvature R, whereas the second prism surface may be formed with a composite curved profile having a plurality of radii of curvature. The example may be adoptable to adjustment of profile on the base B side of the second prism surface 11b, as shown in FIG. 9. By optimizing the curved profile on the base B side, the degree of freedom in designing the output viewing angle and position of center of gravity of intensity distribution may be improved. An specific exemplary design is such that a portion of inclined surface between apex O and a midpoint to base B is formed with a common radius of curvature R, and a portion between the midpoint to base B is formed with a radius of curvature R1 smaller than R, or a radius of curvature R2 larger than R.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A light control element comprising:
a plane of output allowing light to output therethrough; and
a plane of incidence having thereon a number of prism portions arrayed in parallel, the prism portions having a first prism surface allowing incidence of light and a second prism surface where the light entering through the first prism surface is reflected by total reflection on an inner surface side and to output through the plane of output, wherein a second prism surface is formed as being outwardly swelled in a curved profile being outwardly swelled with a curvature allowing the light to output through the plane of output at a second output viewing angle wider than a first output viewing angle of a case where the second prism surface is flat.

2. The light control element as claimed in claim 1, wherein:
the prism portion is configured using a virtual prism component as a reference, the virtual prism component having one apex and two bases, a cross section of the virtual prism component being triangular;
the first prism surface is formed along a straight line connecting the apex and one base of the virtual prism component; and
the second prism surface is formed along an arc which passes through the apex and the other base of the virtual prism component.

3. The light control element as claimed in claim 2, wherein the second prism surface satisfies a condition $1.1 < R/H \leq 5.0$, where height of the prism portion is H [μm], and
radius of curvature of the second prism surface is R [μm].

4. The light control element as claimed in claim 2,
wherein the first prism surface is formed along an arc which passes through the apex and one base of the virtual prism component.

5. A surface light source device comprising:
a light control element which includes:
a plane of output allowing light to output therethrough, and
a plane of incidence having thereon a number of prism portions arrayed in parallel, the prism portions having a first prism surface allowing incidence of light and a second prism surface where the light entering through the first prism surface is reflected by total reflection on the inner surface side to output the light from the plane of output, the second prism surface having an outwardly-swelled curved profile, formed with a curvature that allows the light to output through the plane of output at a second output viewing angle wider than a first output viewing angle of a case where the second prism surface is flat;
a light guide plate disposed on a side of the plane of incidence of the light control element and made of a translucent material having a side end portion; and
a light source disposed at the side end portion of the light guide plate.

6. A liquid crystal display apparatus comprising:
a light control element which includes:
a plane of output allowing light to output therethrough, and
a plane of incidence having thereon a number of prism portions arrayed in parallel, the prism portions having a first prism surface allowing incidence of light and a second prism surface where the light entering through the first prism surface is reflected by total reflection on the inner surface side to output the light from the plane of output, the second prism surface having an outwardly-swelled curved profile, formed with a curvature that allows the light to output through the plane of output at a second output viewing angle wider than a first output viewing angle of a case where the second prism surface is flat;
a light guide plate disposed on a side of the plane of incidence of the light control element and made of a translucent material having a side end portion;
a light source disposed at the side end portion of the light guide plate; and
a liquid crystal display panel disposed on a side of the plane of output of the light control element.

* * * * *